United States Patent
Parmar

(10) Patent No.: US 10,228,046 B2
(45) Date of Patent: Mar. 12, 2019

(54) ELECTRIC LINEAR ACTUATOR HAVING PLANETARY GEAR ARRANGEMENT

(71) Applicant: Caterpillar Inc., Peoria, IL (US)

(72) Inventor: Nainesh Mansukhbhai Parmar, Bloomington, IL (US)

(73) Assignee: Caterpillar Inc., Deerfield, IL (US)

( * ) Notice: Subject to any disclaimer, the term of this patent is extended or adjusted under 35 U.S.C. 154(b) by 127 days.

(21) Appl. No.: 15/387,254

(22) Filed: Dec. 21, 2016

(65) Prior Publication Data

US 2018/0172122 A1    Jun. 21, 2018

(51) Int. Cl.
| | |
|---|---|
| *F16H 25/20* | (2006.01) |
| *F16H 1/28* | (2006.01) |
| *F16H 57/08* | (2006.01) |
| *E02F 3/42* | (2006.01) |

(52) U.S. Cl.
CPC .............. *F16H 25/20* (2013.01); *F16H 1/28* (2013.01); *F16H 57/082* (2013.01); *E02F 3/422* (2013.01); *E02F 3/427* (2013.01); *F16H 2025/2031* (2013.01); *F16H 2025/2087* (2013.01)

(58) Field of Classification Search
None
See application file for complete search history.

(56) References Cited

U.S. PATENT DOCUMENTS

| | | | |
|---|---|---|---|
| 7,802,488 B2 * | 9/2010 | Bucheton | F16H 25/205 74/89.23 |
| 8,011,675 B2 | 9/2011 | Suyama | |
| 8,177,160 B2 | 5/2012 | Hadley et al. | |
| 9,970,236 B2 * | 5/2018 | Nanayakkara | E21B 7/062 |
| 2005/0039553 A1 | 2/2005 | Chen et al. | |
| 2005/0051988 A1 * | 3/2005 | Gradu | B60G 7/003 280/124.134 |
| 2005/0183525 A1 * | 8/2005 | Blendea | F16H 25/20 74/89.23 |
| 2010/0066040 A1 * | 3/2010 | Suyama | B62D 5/0418 280/5.522 |
| 2014/0298980 A1 * | 10/2014 | Cyren | F16H 25/2015 91/41 |

FOREIGN PATENT DOCUMENTS

| | | |
|---|---|---|
| DE | 3514247 C1 | 10/1986 |
| FR | 3 031 154 | 7/2016 |
| WO | WO 2016/107885 A1 | 7/2016 |

* cited by examiner

*Primary Examiner* — Justin Holmes
(74) *Attorney, Agent, or Firm* — Finnegan, Henderson, Farabow, Garrett & Dunner, LLP

(57) ABSTRACT

An electric linear actuator is provided. The electric linear actuator may have a cylinder housing, an electric motor disposed inside the cylinder housing, a piston rod at least partially slidably disposed inside the cylinder housing, and a planetary gear arrangement disposed inside the cylinder housing and configured to connect the electric motor to the piston rod. The planetary gear arrangement may have a ring gear integrally connected to the piston rod. The electric motor, the planetary gear arrangement, and the piston rod may be disposed in series along a central axis of the cylinder housing.

16 Claims, 3 Drawing Sheets

ELECTRIC LINEAR ACTUATOR HAVING PLANETARY GEAR ARRANGEMENT

TECHNICAL FIELD

The present disclosure relates generally to an electric linear actuator, and more particularly, to an electric linear actuator having a planetary gear arrangement.

BACKGROUND

Machines such as, for example, excavators, loaders, dozers, motor graders, and other types of heavy equipment use multiple actuators to move work tools connected to the machines. Recently, conventional hydraulic actuators have been replaced with electric actuators that can operate at higher efficiencies. An exemplary electric actuator includes a nut, and a screw shaft that drives the nut to travel linearly as the shaft is rotated inside the nut by an electric motor.

Although electric linear actuators may be more efficient than hydraulic actuators, the screw/nut mechanism in the exemplary actuator may be problematic. In particular, available screw/nut mechanisms employ large diameter screws. The larger the screw is, the thinner the wall of the associated cylinder. This relationship can limit a load-carrying capacity of the actuator. In some applications, conventional electric actuators use external gear trains to gain mechanical advantage and increase the load-carrying capacity. External gear trains, however, result in extra components, space, and cost.

One electric linear actuator having an internal reduction gear is described in U.S. Pat. No. 8,011,675 (the '675 patent) that was issued to Koichi Suyama on Sep. 6, 2011. The '675 patent describes an expansion actuator employing an internal screw feed mechanism formed from a male thread member and a female thread member. The male and female thread members are screwed one into the other and are driven by a motor via two reduction gears. The internal screw feed mechanism is disposed to surround the motor and the reduction gear. A relative axial displacement between the male thread member and the female thread member can be outputted as expansion and contraction due to relative movement of associated tubular housings.

Although the linear electric actuator of the '675 patent may solve some problems associated with conventional electrical actuators, it may not be optimal. In particularly, since the screw feed mechanism of the '675 patent surrounds the motor and the reduction gear, an expansion and contraction length range along the axis may be limited. Further, the utilization of two reduction gears renders the electric liner actuator of the '675 patent more complex and costly.

The disclosed electric linear actuator is directed to overcoming one or more of the problems set forth above.

SUMMARY

One aspect of the present disclosure is directed to an electric actuator. The electric actuator may include a cylinder housing, an electric motor disposed inside the cylinder housing, a piston rod at least partially slidably disposed inside the cylinder housing, and a planetary gear arrangement disposed inside the cylinder housing and configured to connect the electric motor to the piston rod. The planetary gear arrangement may include a ring gear integrally connected to the piston rod. The electric motor, the planetary gear arrangement, and the piston rod may be disposed in series along a central axis of the cylinder housing.

Another aspect of the present disclosure is directed to another electric actuator. This electric actuator may include a cylinder housing, an electric motor disposed inside the cylinder housing, a piston rod at least partially slidably disposed inside the cylinder housing, and a planetary gear arrangement disposed inside the cylinder housing and configured to connect the electric motor to the piston rod. The planetary gear arrangement may include a planet carrier, and a retainer connected to the planet carrier and having continuous threads on an outer circumferential surface that engage corresponding threads formed on an inner circumferential surface of the cylinder housing.

Yet another aspect of the present disclosure is a machine. The machine may include a frame, a linkage pivotally connected to the frame, and an electric actuator configured to affect movement of the linkage relative to the frame. The electric actuator may include a cylinder housing, an electric motor disposed inside the cylinder housing, a piston rod at least partially slidably disposed inside the tubular housing, a planetary gear arrangement disposed inside the cylinder housing and configured to connect the electric motor to the piston rod. The planetary gear arrangement may include a sun gear, a planet carrier, at least one set of planetary gears that are received in the carrier and engaged with the sun gear, a ring gear engaged with the planet gears and rotationally fixed to the piston rod, and a retainer rotationally connected to the carrier. The retainer may include continuous threads on an outer circumferential surface that engage corresponding threads formed on an inner circumferential surface of the cylinder housing. The electric motor, the planetary gear arrangement, and the piston rod may be disposed in series along an central axis of the cylinder housing.

DETAILED DESCRIPTION

Figure 1:
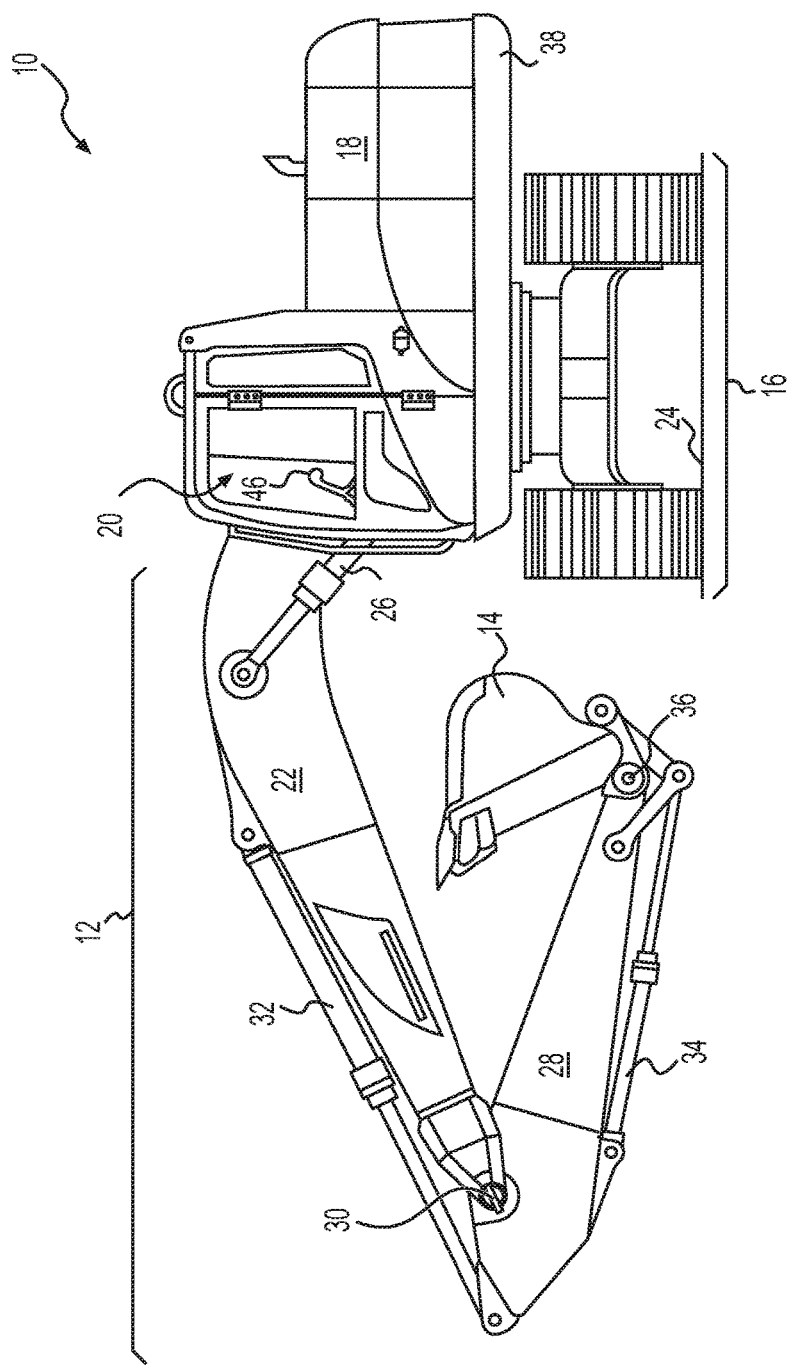
FIG. 1 is a side-view diagrammatic illustration of an exemplary disclosed machine.

FIG. 1 illustrates an exemplary machine 10 having multiple systems and components that cooperate to accomplish a task. Machine 10 may embody a fixed or mobile machine that performs some type of operation associated with an industry such as mining, construction, farming, transportation, or another industry known in the art. For example, machine 10 may be an earth moving machine such as an excavator (shown in FIG. 1), a dozer, a loader, a backhoe, a motor grader, a dump truck, or another earth moving machine. Machine 10 may include an implement system 12 configured to move a work tool 14, a power source 18 that provides power to implement system 12, and an operator station 20 for operator control of implement system 12.

Implement system 12 may include a linkage structure acted on by one or more electric actuators to move work tool 14. Specifically, implement system 12 may include a boom 22 that is vertically pivotal about a horizontal axis (not shown) relative to a work surface 24 by a pair of adjacent, double-acting cylinders 26 (only one shown in FIG. 1). Implement system 12 may also include a stick 28 that is vertically pivotal about a horizontal pivot axis 30 by a single, double-acting cylinder 32. Implement system 12 may further include a single, double-acting cylinder 34 that is operatively connected to work tool 14 to pivot work tool 14 vertically about a horizontal pivot axis 36. Boom 22 may be pivotally connected to a frame 38 of machine 10. Stick 28 may pivotally connect boom 22 to work tool 14 by way of pivot axis 30 and 36.

Each of cylinders 26, 32, 34 may include a tubular housing and a piston rod assembly (not shown) arranged therein. The piston rod assembly may be displaced within the tubular housing, thereby changing an effective length of cylinders 26, 32, 34. As a result, a force may be imparted by cylinders 26, 32, 34 on the associated linkage members. The expansion and retraction of cylinders 26, 32, 34 may function to assist in moving work tool 14.

Numerous different work tools 14 may be attachable to a single machine 10 and controllable via operator station 20. Work tool 14 may include any device used to perform a particular task such as, for example, a bucket, a fork arrangement, a blade, a shovel, a ripper, a dump bed, a broom, a snow blower, a propelling device, a cutting device, a grasping device, or any other task-performing device known in the art. Although connected in the embodiment of FIG. 1 to pivot relative to machine 10, work tool 14 may alternatively or additionally rotate, slide, swing, lift, or move in any other manner known in the art.

Power source 18 may embody an engine such as, for example, a diesel engine, a gasoline engine, a gaseous fuel-powered engine, or any other type of combustion engine known in the art. It is contemplated that power source 18 may alternatively embody a non-combustion source of power such as a fuel cell, a power storage device, or another source known in the art. Power source 18 may produce a mechanical and/or electrical output that powers cylinders 26, 32, 34.

Operator station 20 may be configured to receive input from a machine operator indicative of a desired work tool movement. Specifically, operator station 20 may include one or more operator interface devices 46 embodied as single or multi-axis joysticks located proximal an operator seat. Operator interface devices 46 may be proportional-type controllers configured to position and/or orient work tool 14 by producing a work tool position signal that is indicative of a desired work tool velocity. It is contemplated that different operator interface devices may alternatively or additionally be included within operator station 20 such as, for example, wheels, knobs, push-pull devices, switches, pedals, and other operator interface devices known in the art.

Figure 2:
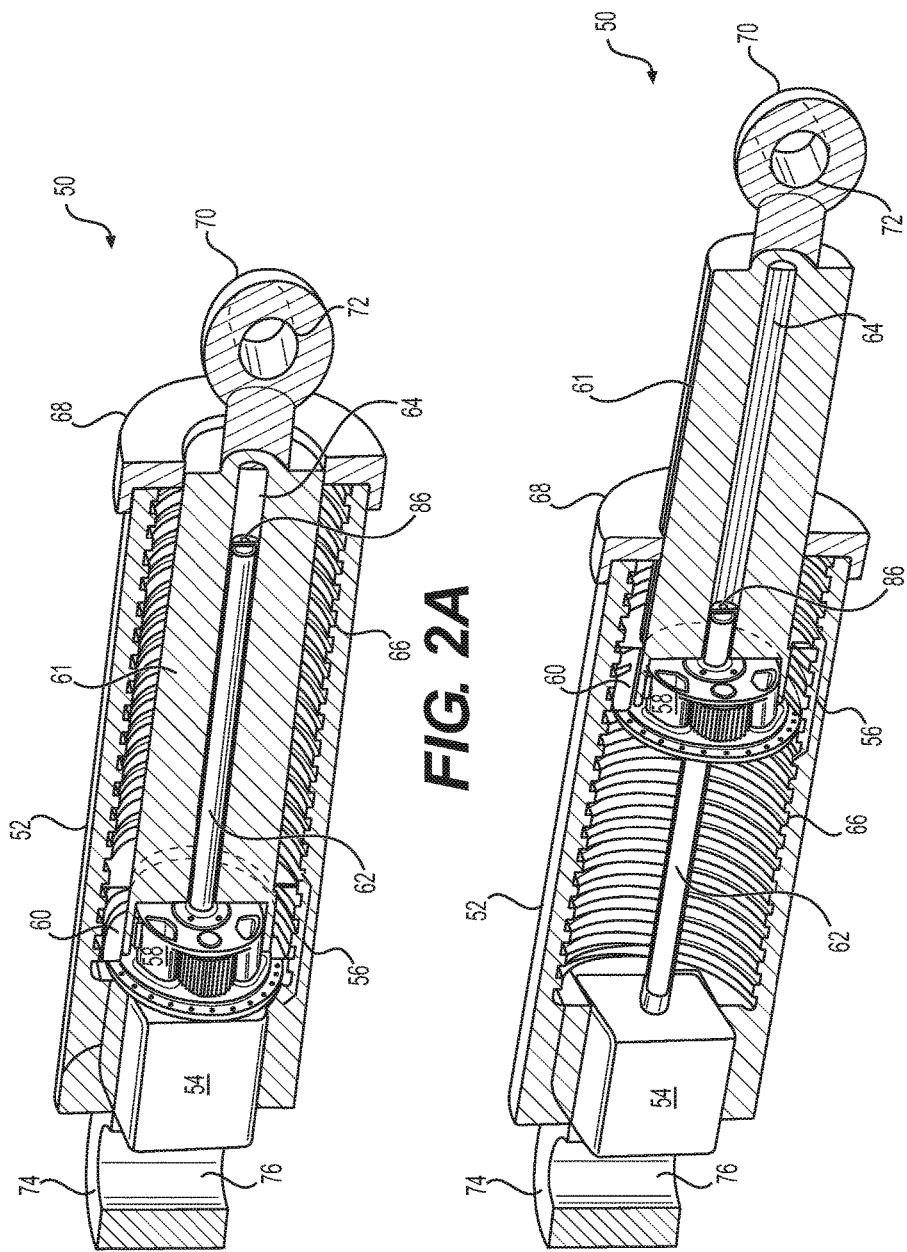
FIGS. 2A and 2B are schematic cutaway illustrations of an exemplary disclosed electric linear actuator that may be used with the machine of FIG. 1.

One or more of cylinders 26, 32, 34 may embody electric linear actuators. FIGS. 2A and 2B are schematic cutaway illustrations of an exemplary disclosed electric linear actuator 50 that may represent any one of cylinders 26, 32, or 34. Actuator 50 may include a tubular housing 52, an electric motor 54, a planetary gear arrangement 56, a piston rod 61, and a shaft 62. Motor 54 may be securely fixed inside tubular housing 52 and connected to rotate shaft 62. Shaft 62 may slidably connected to drive planetary gear arrangement 56 as an input. Planetary gear arrangement 56 may be rotationally disposed inside tubular housing 52. Piston rod 61 may be securely attached to a rotationally stationary portion of planetary gear arrangement 56 and slidably disposed in tubular housing 52. To extend actuator 50, motor 54 may rotate shaft 62 in a first direction (e.g., a clockwise direction) to cause a portion of planetary gear arrangement 56 to rotate accordingly. Due to fixation of tubular housing 52, a rotational movement of planetary gear arrangement 56 relative to tubular housing 52 may cause a corresponding linear extrusion of piston rod 61 from tubular housing 52. Similarly, to retract actuator 50, motor 54 may rotate shaft 62 in an opposite direction (e.g., a counterclockwise direction) to cause planetary gear arrangement 56 to rotate accordingly. Due to fixation of tubular housing 52, a rotational movement of planetary gear arrangement 56 relative to tubular housing 52 may cause a corresponding linear retraction of piston rod 61 back into tubular housing 52.

In some embodiments, actuator 50 may include an end cap 68 that covers one end of tubular housing 52. End cap 68 may have a circular bore in a center thereof, allowing piston rod 61 to pass through and to provide a support for piston rod 61 to slide linearly. End cap 68 may also provide a stop for planetary gear arrangement 56 that inhibits planetary gear arrangement 56 from moving out of tubular housing 52. In addition, end cap 68 may provide a seal for tubular housing 52 from an external environment. Further, end cap 68 may also provide a stop for piston rod 61 and inhibit rotation of piston rod 61.

In some embodiments, motor 54, planetary gear arrangement 56 and piston rod 61 may be disposed in series along a central axis of tubular housing 52. It is contemplated, however, that other configurations of motor 54, planetary gear arrangement 56, and piston rod 61 may be possible.

In some embodiments, actuator 50 may include a first end 70 that is pivotally connected to a pin of boom 22 (referring to FIG. 1) via a bore 72, and a second end 74 that is pivotally connected via a bore 76 to a pin of frame 38. In such a way, boom 22 may be moved relative to frame 38 by extension and contraction of piston rod 61. This connection also keeps tubular housing 52 and piston rod 61 from rotating (i.e., fixed rotationally). In some embodiment, however, end cap 68 may also help to rotationally fix piston rod 61.

Motor 54 may embody many types of motors that can be used in a linear actuator. For example, motor 54 may be a direct-current brush motor, a brushless and permeant magnet motor, a stepper motor, or an induction motor. The particular type of motor 54 may depend on application requirements and loads actuator 50 is designed to move.

Tubular housing 52 may include an inner cylindrical chamber configured to receive motor 54, planetary gear arrangement 56, piston rod 61, and shaft 62 connecting motor 54 to planetary gear arrangement 56. Further, an inner surface of the inner cylindrical chamber may be formed with continuous threads 66. Continuous threads 66 may extend an entire axial length of tubular housing 52.

Piston rod 61 may embody a cylinder having a bore 64 formed along its central axis. Bore 64 may provide clearance for shaft 62 to slide linearly and axially inside of piston rod 61 as piston rod 61 extends outward and retracts inward. Shaft 62 may have threads circumferentially on an outer surface thereof that may be used to engage planetary gear arrangement 56. In addition, shaft 62 may have an end bearing 86 at a distal end thereof opposite motor 54. End bearing 86 may be supported inside bore 64. End bearing 86 may help to prevent shaft 62 from bending and to allow only a sliding axial motion in bore 64 with respect to piston rod 61, while shaft 62 is being rotated by motor 54.

Figure 3:
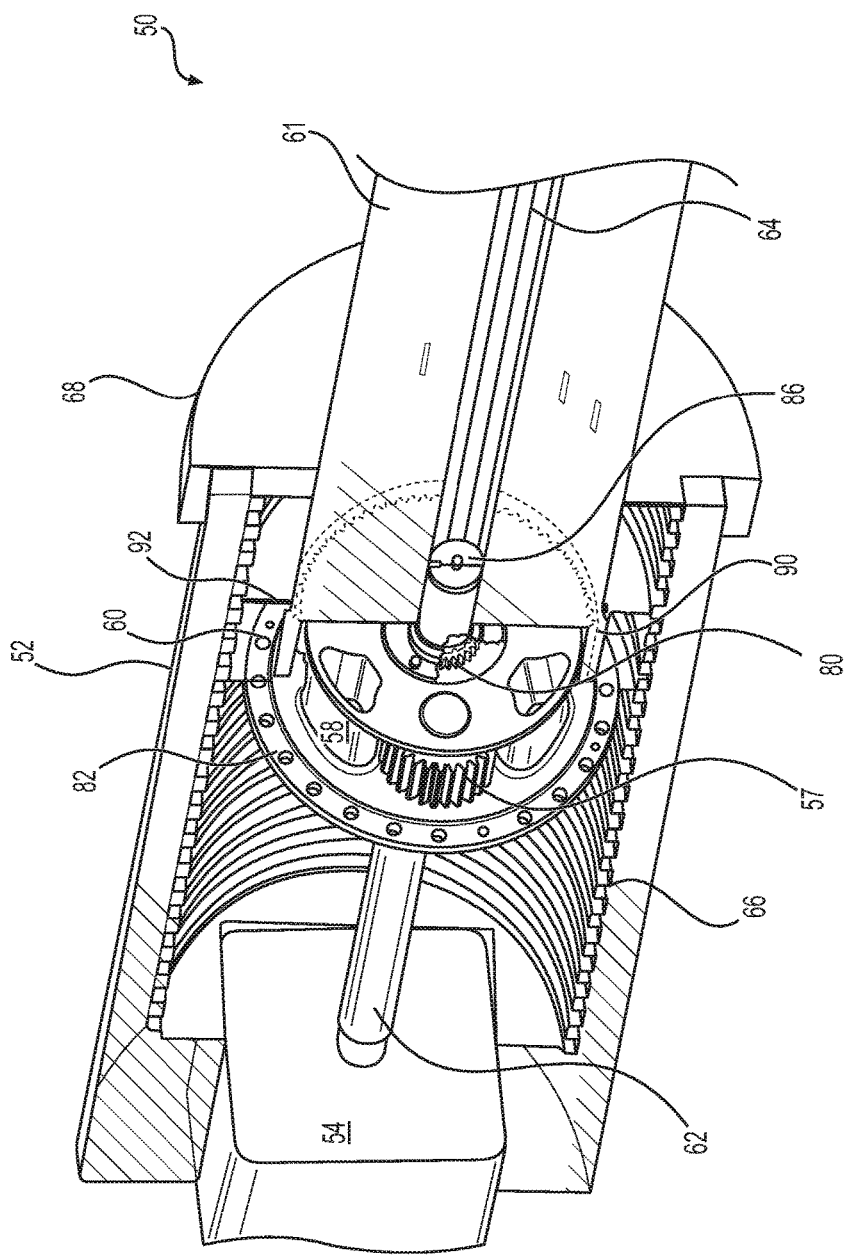
FIG. 3 is an enlarged schematic illustration of the exemplary disclosed electric linear actuator in FIGS. 2A and 2B.

FIG. 3 is an enlarged schematic illustration of a portion of electric linear actuator 50 shown in FIGS. 2A and 2B. As shown in FIG. 3, planetary gear arrangement 56 may have at least three elements, including a sun gear 80, a planet carrier 58 having at least one set of connected planet gears 57, and a ring gear 90 all disposed within the inner cylindrical chamber of tubular housing 52. Planet gears 57 are located an supported between and mesh with sun gear 80 and ring gear 90. Sun gear 80, planet carrier 58, and planet gears 57 all rotate simultaneously (although not necessarily at the same speeds and/or in the same directions). Planetary gear arrangement 56 receives an input rotation via sun gear 80 and generates a corresponding output rotation via planet carrier 58. The change in rotational speed between the input and the output rotations depends on the number of teeth in sun gear 80, planet gears 57, and ring gear 90.

Sun gear 80 may be driven by shaft 62 via a toothed or splined interface of shaft 62. Planet gears 57 may be connected to rotate with planet carrier 58 about the central axis of tubular housing 52 and to also rotate about their own axes. Ring gear 90 may be integrally connected to a first end of piston rod 61 and configured to have a raised step with respect to the first end of piston rod 61. Ring gear 90 may also be positioned between carrier 58 and a retainer 60.

Planetary carrier 58 may have a flange 82 located at an end closest to motor 54, and support planet gears 57. Retainer 60 may be fixedly connected to carrier 58 by being joined to flange 82 (e.g., by bolting) and at least partially surround planet gears 57, planet carrier 58, and ring gear 90.

The raised step of an end face of ring gear 90 facilitates the connection of planetary gear arrangement 56 to piston rod 61. Retainer 60 may also be configured to have a protrusion edge 92 circumferentially toward the central axis of tubular housing 52. Protrusion edge 92 matches the raised step of ring gear 90 such that ring gear 90 is held in place radially between carrier 58 and retainer 60 while it is allowed to rotate relative to planet gears 57.

Retainer 60 may have continuous threads on an outer surface thereof that mesh with continuous threads 66 formed inside of the inner cylindrical chamber of tubular housing 52. Thus, the rotational motion of shaft 62 may be transmitted through sun gear 80 to planet gear 57, to carrier 58, to flange 82, and to retainer 60. Accordingly, the rotational movement of retainer 60 with respect to stationary tubular housing 52 may cause piston rod 61 that is connected to ring gear 90 to move linearly along the central axis of tubular housing 52.

INDUSTRIAL APPLICABILITY

The disclosed electric linear actuator may be applicable to any machine that includes movable linkages and/or work tools. For example, the machine may be an earth moving machine such as an excavator, a dozer, a loader, a backhoe, a motor grader, a dump truck, or any other earth moving machine. The disclosed electric linear actuators may be used to move the work tools in a desired manner, with a desired velocity, and/or with a desired force.

Several benefits may be associated with the disclosed electric linear actuator. For example, because electric motor 54, planetary gear arrangement 56, and piston rod 61 may be configured in series along a central axis of tubular housing 52, a complexity of actuator 50 may be reduced, and an extension and contraction range may be improved.

It will be apparent to those skilled in the art that various modifications and variations can be made to the disclosed linear actuator. Other embodiments will be apparent to those skilled in the art from consideration of the specification and practice of the disclosed linear actuator. It is intended that the specification and examples be considered as exemplary only, with a true scope being indicated by the following claims and their equivalents.

What is claimed is:

1. An electric linear actuator, comprising:
   a cylinder housing;
   an electric motor disposed inside the cylinder housing;
   a piston rod at least partially slidably disposed inside the cylinder housing;
   a planetary gear arrangement disposed inside the cylinder housing and configured to connect the electric motor to the piston rod, the planetary gear arrangement including a ring gear integrally connected to the piston rod,
   wherein the electric motor, the planetary gear arrangement, and the piston rod are disposed in series along a central axis of the cylinder housing;
   a sun gear; and
   at least one set of planet gears engaged with the sun gear and the ring gear;
   a shaft connecting the electric motor to the sun gear, wherein the shaft slides axially in a bore of the piston rod.

2. The electric actuator of claim 1, wherein the planetary gear arrangement further includes:
   a carrier configured to receive at least one set of planet gears engaged with the ring gear; and
   a retainer disposed inside the cylinder housing and fixedly connected to the carrier, the retainer having continuous threads on an circumferential surface that are configured to engage corresponding threads formed on an inner circumferential surface of the cylinder housing.

3. The electric actuator of claim 2, wherein the ring gear is positioned radially between the carrier and the retainer.

4. The electric actuator of claim 2, wherein the corresponding threads extend an entire axial length of the cylinder housing.

5. The electric actuator of claim 1, further including a cap at an end of the cylinder housing and configured to provide a stop for the piston rod.

6. The electric actuator of claim 1, wherein the cap inhibits rotation of the piston rod.

7. The electric actuator of claim 1, further including an end bearing located at a distal end of the shaft opposite the electric motor and configured to support the shaft inside the piston rod.

8. An electric actuator, comprising:
   a cylinder housing;
   an electric motor disposed inside the cylinder housing;
   a piston rod at least partially slidably disposed inside the cylinder housing;
   a planetary gear arrangement disposed inside the cylinder housing configured to connect the electric motor to the piston rod, the planetary gear arrangement including a planet carrier and a retainer connected to the planet carrier and having continuous threads on an outer circumferential surface that engage corresponding threads formed on an inner circumferential surface of the cylinder housing; and
   a cap at an end of the cylinder housing configured to provide a stop for the piston rod and to inhibit rotation of the piston rod.

9. The electric actuator of claim 8, wherein the planetary gear arrangement includes a ring gear integrally connected to the piston rod.

10. The electric actuator of claim 8, wherein the corresponding threads formed on the inner circumferential surface of the cylinder housing extend an entire axial length of the cylinder housing.

11. The electric actuator of claim 9, wherein the planet carrier supports at least one set of planet gears engaged with the ring gear.

12. The electric actuator of claim 8, wherein the retainer is rotationally fixed to the carrier.

13. The electric actuator of claim 11, further including:
   a sun gear engaged with the at least one set of planet gears; and
   a shaft connecting the electric motor to the sun gear.

14. The electric actuator of claim 13, wherein the shaft slides axially in a bore of the piston rod.

15. The electric actuator of claim 13, further including an end bearing located at a distal end of the shaft opposite the electric motor and configured to support the shaft inside the piston rod.

16. The electric actuator of claim 9, wherein the ring gear is positioned radially between the carrier and the retainer.

\* \* \* \* \*